United States Patent [19]

Thomson et al.

[11] Patent Number: 5,649,738
[45] Date of Patent: Jul. 22, 1997

[54] LIGHTWEIGHT HIGH STRENGTH BICYCLE SEAT POST AND ASSOCIATED CLAMP

[75] Inventors: Loronzo Harold Thomson; Daniel Rudy Nietzold, both of Warner Robins, Ga.

[73] Assignee: L.H. Thomson Company, Inc., Macon, Ga.

[21] Appl. No.: 515,795

[22] Filed: Aug. 16, 1995

[51] Int. Cl.⁶ ........................................................ B62J 1/00
[52] U.S. Cl. .................... 297/215.15; 297/195.1; 297/207; 297/217.2
[58] Field of Search .................... 297/215.15, 215.14, 297/195.1, 207, 217.2

[56] References Cited

U.S. PATENT DOCUMENTS

| | | | |
|---|---|---|---|
| D. 332,436 | 1/1993 | Liao | D12/119 |
| D. 342,467 | 12/1993 | Ringle | D12/119 |
| D. 369,577 | 5/1996 | Liou | D12/119 |
| 607,651 | 7/1898 | Blossom | 297/207 |
| 2,186,483 | 1/1940 | Guidetti | 297/207 |
| 3,346,280 | 10/1967 | Pfaff, Jr. et al. | 287/14 |
| 3,347,572 | 10/1967 | Pfaff, Jr. et al. | 287/14 |
| 3,891,333 | 6/1975 | Corderack | 403/84 |
| 3,933,391 | 1/1976 | Shook | 297/195 |
| 3,992,054 | 11/1976 | Campagnolo | 297/195 |
| 4,120,512 | 10/1978 | Newlands | 280/281 R |
| 4,142,813 | 3/1979 | Laborde | 297/195 |
| 4,155,590 | 5/1979 | Cunningham | 297/195 |
| 4,275,922 | 6/1981 | Juy | 297/195 |
| 4,421,357 | 12/1983 | Shimano | 297/195 |
| 4,440,440 | 4/1984 | Juy | 297/195 |
| 4,502,811 | 3/1985 | Patriarca | 297/215.14 X |
| 4,693,627 | 9/1987 | Borromeo | 403/24 |
| 4,772,069 | 9/1988 | Szymski | 297/195 |
| 4,783,119 | 11/1988 | Moses | 297/195 |
| 4,836,604 | 6/1989 | Romano | 297/195 |
| 4,983,063 | 1/1991 | Phillips | 403/4 |
| 4,987,764 | 1/1991 | Chen | 72/367 |
| 4,995,753 | 2/1991 | Shook | 403/24 |
| 5,020,851 | 6/1991 | Chen | 297/195 |
| 5,190,346 | 3/1993 | Ringle | 297/195 |
| 5,228,796 | 7/1993 | Kao | 403/84 |
| 5,362,127 | 11/1994 | Chang | 297/195.1 |
| 5,383,706 | 1/1995 | Chen | 297/215.15 |
| 5,441,327 | 8/1995 | Sanderson | 297/195.1 |
| 5,443,301 | 8/1995 | Lai | 297/195.1 |
| 5,466,042 | 11/1995 | Herman | 297/215.15 |
| 5,547,155 | 8/1996 | Herting | 297/215.15 X |
| 5,568,958 | 10/1996 | Chen | 297/215.14 X |
| 5,568,991 | 10/1996 | Lin | 297/195.1 X |
| 5,571,273 | 11/1996 | Saarinen | 297/215.15 |

FOREIGN PATENT DOCUMENTS

| | | |
|---|---|---|
| 2 409 182 | 11/1977 | France . |
| 29501393 | 1/1995 | Germany . |

Primary Examiner—Peter M. Cuomo
Assistant Examiner—Rodney B. White
Attorney, Agent, or Firm—Allen, Dyer, Doppelt, Milbrath & Gilchrist, P.A.

[57] ABSTRACT

A bicycle seat post and clamp includes a tube and a flange connected to an end thereof with the flange comprising a pair of opposing ears extending longitudinally outwardly from the tube and having an upper surface defining a laterally extending recess for receiving a lower clamp member. A lower clamp member preferably includes a lower clamp body portion having a lower surface defining a laterally extending partial cylindrical shape received in the recess of the flange, and a pair of lower rail channel defining portions connected to respective opposing longitudinally extending sides of the lower clamp body portion. Each of the lower rail channel defining portions preferably includes at least one cantilevered rail support portion extending outwardly from the lower clamp body portion. The upper clamp member preferably includes an upper clamp body portion and a pair of upper rail channel defining portions connected to respective opposite longitudinally extending sides of the upper clamp body portion. A pair of fasteners secure opposing longitudinal ends of the upper clamp body portion to corresponding ears of the flange so as to clamp the bicycle seat rails between upper and lower rail channel defining portions of the upper and lower clamp members. The flange and the clamp may have relative strengths so that the tube of the seat post bends, responsive to a relatively large force offset from an axis of the tube, and prior to failure of one of the flange and the clamp.

86 Claims, 6 Drawing Sheets

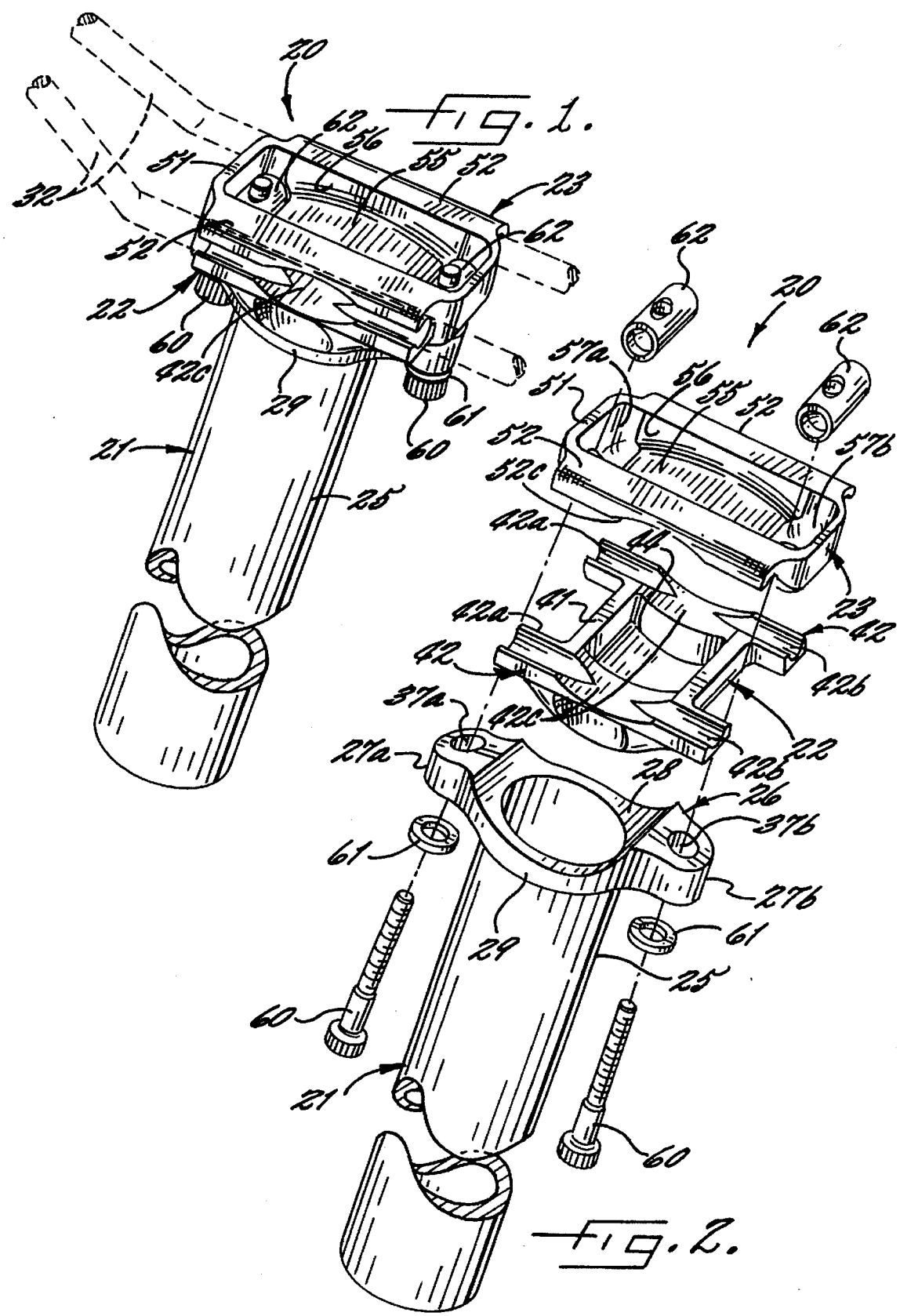

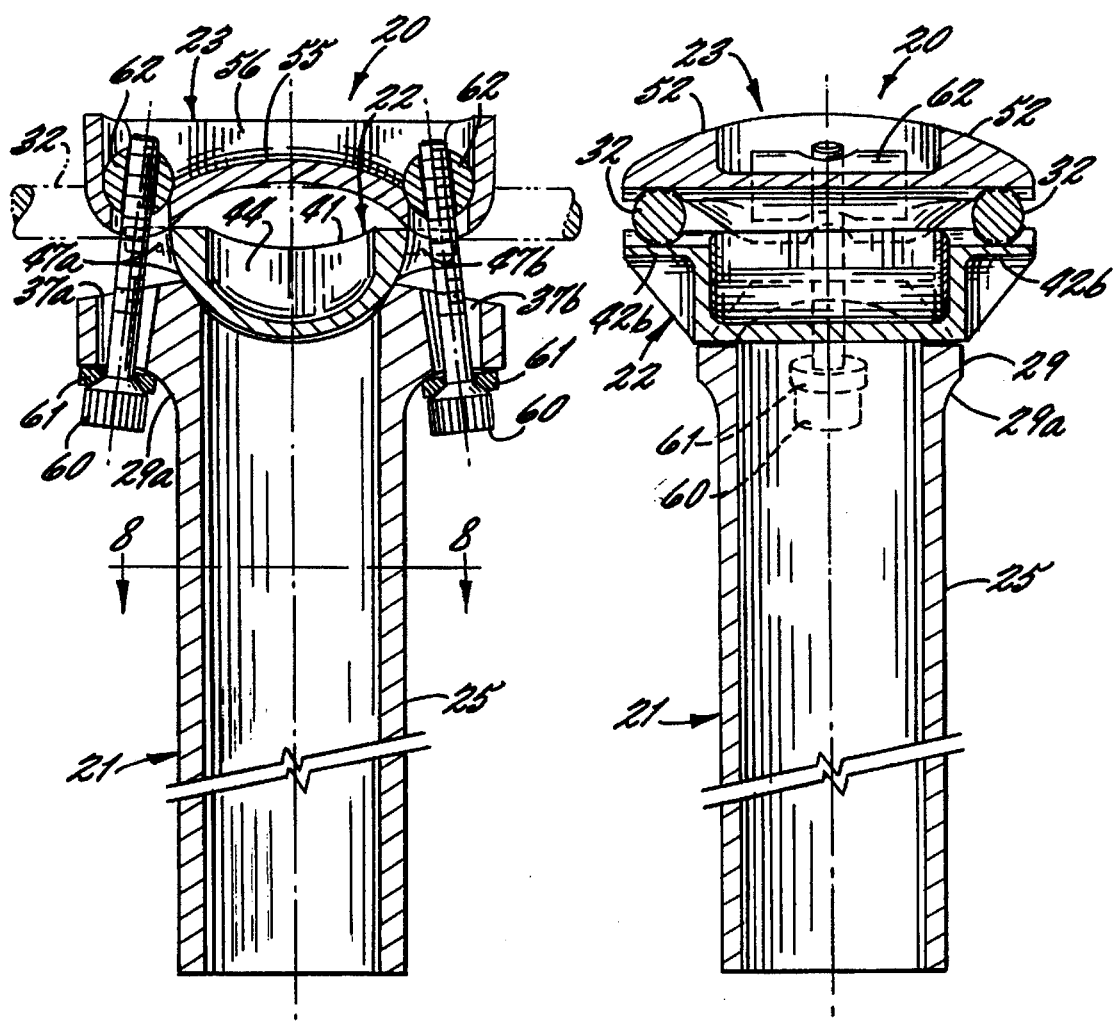

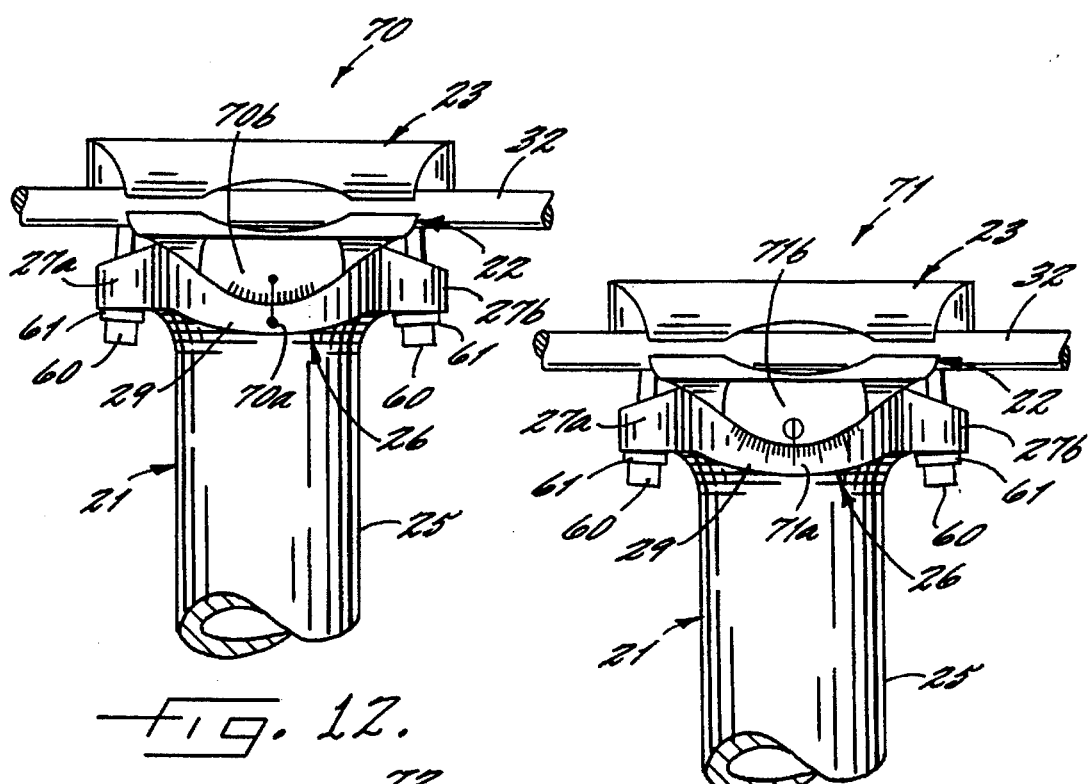
Fig. 12.
Fig. 13.
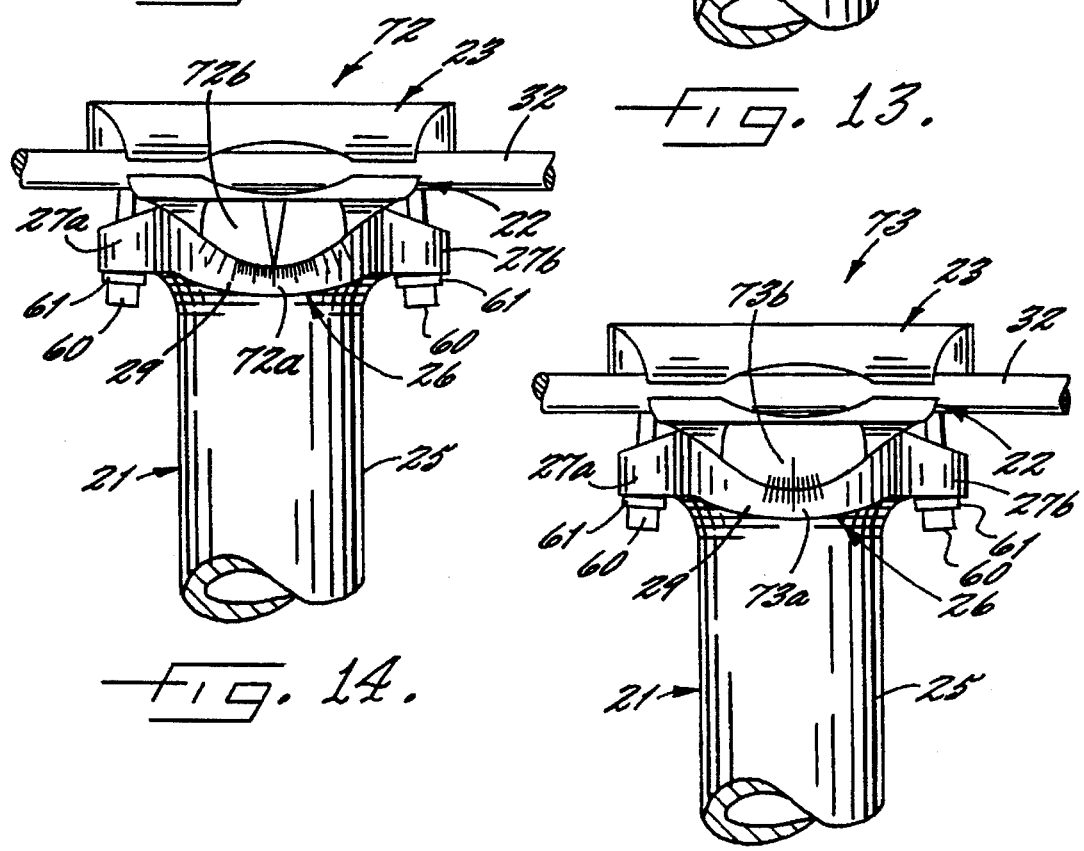
Fig. 14.
Fig. 15.

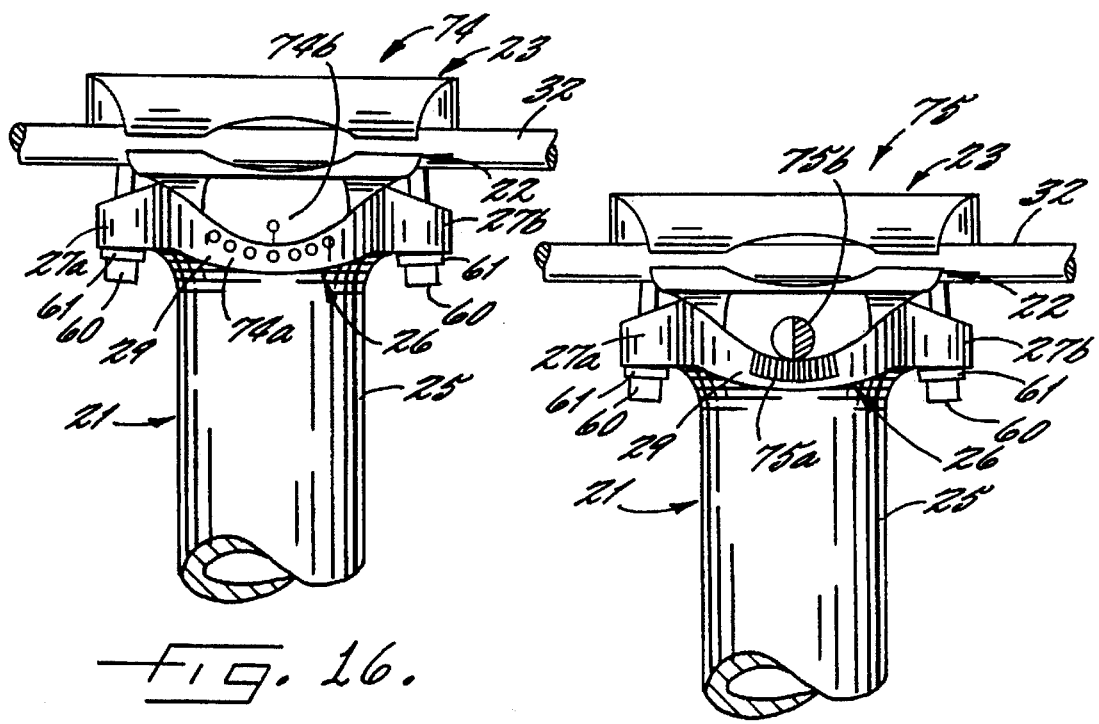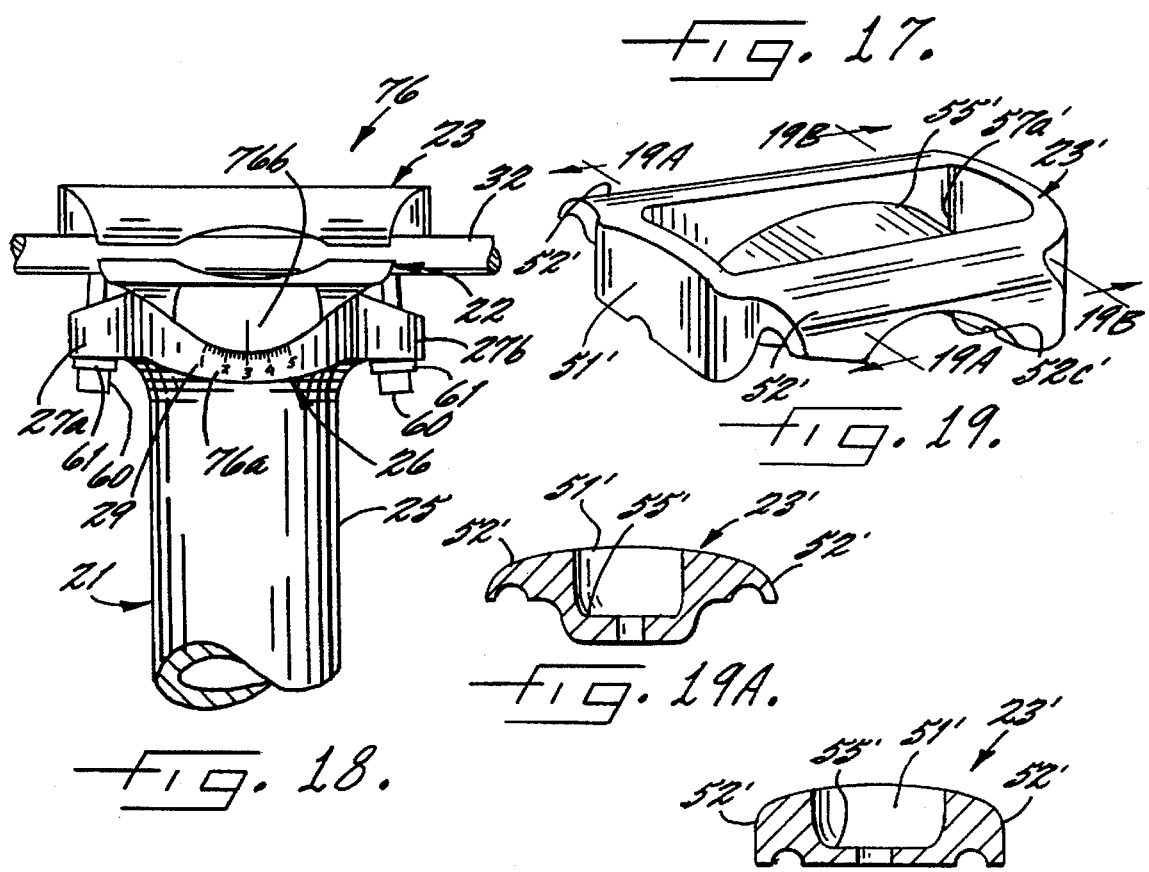

5,649,738

LIGHTWEIGHT HIGH STRENGTH BICYCLE SEAT POST AND ASSOCIATED CLAMP

FIELD OF THE INVENTION

The invention relates to the field of bicycles and, more particularly, to a bicycle seat post and associated clamp.

BACKGROUND OF THE INVENTION

Bicycles are extremely popular for both transportation and particularly for recreation and exercise. High performance off-road bicycles, also called mountain bikes, are widely used for traversing rugged terrain. Like a touring bicycle, a mountain bicycle desirably has a relatively low weight to reduce rider fatigue. Accordingly, the frame and components of a bicycle are desirably light in weight, yet sufficiently strong to reduce the likelihood of damage to the bicycle. The frame and other components of a mountain bike, in particular, may be subjected to very high loads caused by intentional, as well as unintentional jumps, falls, or drops.

A typical bicycle includes a tubular frame having a tubular member to receive a seat post assembly. A seat post assembly, in turn, typically includes a tube adapted to be inserted into the frame member, and a clamp arrangement on the upper end of the tube. The clamp grips a pair of longitudinal seat rails that are, in turn, connected to and extend from an underside of the bicycle seat. The height of the seat relative to the bicycle frame is readily adjustable between minimum and maximum positions for the rider's comfort. The seat angle and its longitudinal position may also typically be adjusted.

U.S. Pat. No. 4,783,119 to Moses discloses a seat post including a seat tube having a concave recess at its upper end. A lower clamp member fits within the concave recess and cooperates with a pair of upper clamp members to secure a pair of seat rails. In addition, a longitudinal rod or pair of integrally formed ears adjacent the upper end of the tube may be symmetrically positioned and include openings to receive a pair of respective bolts to thereby secure the clamp members together and permit adjustment of seat angle.

U.S. Pat. No. 5,190,346 to Ringle discloses a bicycle seat post and clamp including a separate wrap around clamp strap for securing upper and lower clamp members together. The upper end of the seat tube includes a laterally extending recess to receive the lower clamp member. A pin extends longitudinally through the seat tube beneath the recess. The wrap around clamp strap attaches directly to one end of the pin, while a bolt secures the other end of the strap to the other end of the pin.

Unfortunately, a seat post and clamp assembly may experience relatively high loads when a substantial part or all of the rider's weight is brought down onto the seat. The seat post and associated clamp of a mountain bike, in particular, are likely to experience even higher loads as the rider executes jumps and other stunts, where forces greater than the rider's full weight may be imparted to the seat. A conventional seat post and clamp may experience a catastrophic failure during such high loads. Catastrophic failure means that the clamp or end of the seat tube fails, thus allowing the seat to fall away from the bicycle. In other words, since the seat tube may typically be stronger than the clamp, the clamp, the fasteners, or the head of the tube may break allowing the seat to separate and exposing an upper end of the seat tube, for example. Accordingly, such a catastrophic failure increases the risk of injury to the rider.

Conventional seat posts and clamps may not be adjustable over a relatively large range of angles. In addition, conventional seat posts and clamps may not be sufficiently strong at the extreme angular positions. Since the spacing between the seat rails and the underside of the seat may be limited, a low profile clamp may be preferred. Moreover, upper portions of a clamp, such as a bolt, for example, which extend upward beyond the upper clamp member may pose a risk of puncturing the seat and injuring a rider. Yet another difficulty with conventional seat posts and clamps is that the angular adjustment of the seat may be difficult to set or reset to a desired angle.

SUMMARY OF THE INVENTION

In view of the foregoing background, it is therefore an object of the present invention to provide a seat post and associated clamp that is relatively lightweight and yet strong to thereby reduce the likelihood of a catastrophic failure.

It is another object of the present invention to provide a bicycle seat post and associated clamp that is relatively lightweight and yet strong, and that may be readily manufactured.

It is yet another object of the present invention to provide a bicycle seat post and associated clamp which has a relatively low profile and which may be readily set to a desired angle.

These and other objects, features and advantages of the present invention are provided by a bicycle seat post and clamp apparatus comprising: a tube and a flange connected to an end of the tube with the flange comprising a pair of opposing ears extending longitudinally outwardly from the tube and having an upper surface defining a laterally extending recess for receiving a lower clamp member. The lower clamp member preferably includes a lower clamp body portion having a lower surface defining a laterally extending partial cylindrical shape received in the recess of the flange, and a pair of lower rail channel defining portions connected to respective opposing longitudinally extending sides of the lower clamp body portion. In addition, each of the lower rail channel defining portions preferably comprises at least one cantilevered rail support portion extending longitudinally outwardly from the lower clamp body portion. The upper clamp member preferably comprises an upper clamp body portion and a pair of upper rail channel defining portions connected to respective opposite longitudinally extending sides of the upper clamp body portion. A pair of fasteners may secure opposing longitudinal ends of the upper clamp body portion to corresponding ears of the flange so as to clamp the bicycle seat rails between the upper and lower channel defining portions of the upper and lower clamp members.

The cantilevered rail support portions of the lower clamp member serve to more effectively distribute forces imparted to the clamp and flange, that is, the cantilevered rail support portions provide a shock absorbing function. Accordingly, catastrophic failure of the apparatus is less likely to occur. Moreover, another aspect of the invention is that the tube, the flange and the clamp may have relative strengths so that the tube of the seat post bends, responsive to a relatively large force offset from an axis of the tube, and prior to failure of one of the flange and the clamp. Stated in somewhat different terms, the seat post and clamp apparatus in accordance with one aspect of the invention may be considered as having a bending fuse, wherein unusually large forces deform the tube rather than fracture the flange or clamp. Accordingly, the rider receives an additional degree of protection, yet may readily determine that the seat post needs to be replaced by observing a bend in the tube.

Another aspect of the invention that adds to the strength and lightweight characteristics of the apparatus is that the tube and the flange are preferably integrally formed as a monolithic unit, and the upper and lower clamp members are also preferably monolithic units. The flange, and clamp members may be configured to be symmetrical with respect to an imaginary longitudinally extending plane intersecting an axis of the tube, and may also be symmetrical with respect to an imaginary laterally extending plane intersecting an axis of the tube.

The flange of the seat post preferably has spaced apart upper surface portions defining a pair of laterally extending contact surfaces adjacent respective opposite longitudinal edges of the recess. The lateral contact surfaces contact corresponding adjacent portions of the lower clamp body portion. In addition, the flange also preferably comprises an enlarged diameter annular portion connected to the tube for additional strength. The ears of the flange also preferably have respective fastener openings extending therethrough for receiving respective fasteners. The fastener openings preferably taper longitudinally inwardly toward an upper surface of the ears to facilitate rotational adjustment of the clamp relative to the seat post.

The tube preferably has a circular outer diameter and an oval inner diameter so that laterally extending wall portions are thicker than longitudinally extending wall portions. Accordingly, strength is provided while also reducing unnecessary weight. Indicia means may be provided on the seat post and on the clamp for indicating an angle setting of the clamp and seat, relative to the seat post.

The lower clamp body portion preferably defines a cavity opening upwardly and outwardly in a medial portion thereof, thus facilitating manufacture by forging or stamping. In addition, each of the lower rail channel defining portions may have a recess in a medial portion thereof so that the lower rail channel defining portions form a pair of longitudinally spaced apart contact areas for the respective seat rails. Accordingly, secure engagement with the rails is achieved at widely spaced apart portions along the rails.

The upper clamp body portion preferably includes a generally rectangular bottom wall and a sidewall extending upwardly around a periphery of the bottom wall. The bottom wall of the upper clamp body portion may be substantially concave upward for additional strength. The bottom wall of the upper clamp body portion also preferably defines a pair of fastener receiving recesses at opposing longitudinal ends for receiving respective fastener portions therein.

Each of the fasteners may comprise a bolt and a barrel nut secured thereto. Accordingly, the barrel nuts are preferably received in the fastener receiving recesses at the ends of the upper clamp member. Moreover, at least one of the fastener receiving recesses of the lower clamp member may extend below an imaginary plane defined by upper portions of the seat rails. More preferably, an interior surface portion of the fastener receiving recess extends below the imaginary plane defined by the upper surface portions of the seat rails. Accordingly, a low profile is achieved for the clamp, and, a positive rotational stop is provided by a lower surface portion of the fastener receiving recess contacting an adjacent ear of the flange when the clamp is fully rotated.

Similar to the lower clamp member, each of the upper rail channel defining portions may have a recess in a medial portion thereof so that the upper rail channel defining portions define a pair of longitudinally spaced apart contact areas for the respective bicycle seat rails. The upper clamp member may also be readily fabricated by stamping or forging.

Another aspect of the invention is that predetermined edge surfaces of the upper and lower clamp members exposed to the seat rails are preferably rounded over to further protect against damage to the seat rails. Yet another aspect of the invention is that the upper rail defining portions may be connected to the upper clamp body portion at a predetermined canted angle to accommodate adjustment of the clamp to a relatively large angle from perpendicular between the seat and the seat post.

A method aspect of the present invention is for securing a bicycle seat to a bicycle frame, the bicycle seat including a pair of spaced apart longitudinally extending seat rails. The method preferably comprises the steps of: positioning a seat post into a bicycle frame member, the seat post comprising a tube and a flange connected to an end of the tube, the flange having an upper surface defining a recess; positioning a lower clamp member in the recess and securing an upper clamp member overlying the lower clamp member with the seat rails therebetween; and forming the tube, the flange and the clamp to have predetermined relative strengths so that the tube of the seat post bends, responsive to a relatively large force offset from an axis of the tube, and prior to failure of one of the flange and the clamp to thereby provide a bending fuse.

BRIEF DESCRIPTION OF THE DRAWINGS

FIG. 1 is a perspective view of the seat post and clamp in accordance with the present invention in an assembled configuration.

FIG. 2 is an exploded perspective view of the seat post and clamp in accordance with the present invention.

FIG. 6 is a side cross-sectional view of the seat post and clamp in accordance with the present invention.

FIG. 7 is a front cross-sectional view of the seat post and clamp in accordance with the present invention.

FIG. 8 is a cross-sectional view of the seat post as shown in FIG. 6 taken along lines 8—8 and illustrating the oval tube embodiment of the invention.

FIG. 9 is a greatly enlarged side view, partially in section, of a portion of the clamp in accordance with the present invention and illustrating rounded over edge portions contacting the bicycle seat rail.

FIGS. 12 to 18 are side elevation views of respective embodiments of the seat post and clamp in accordance with the present invention illustrating various means for indicating seat angle.

FIG. 19A is a perspective view of an embodiment of an upper clamp member in accordance with the present invention.

FIG. 19B is a cross-sectional view taken along lines 19A—19A of FIG. 19.

FIG. 19B is a cross-sectional view taken along lines 19B—19B of FIG. 19.

DETAILED DESCRIPTION OF THE PREFERRED EMBODIMENTS

Figures 3, 4:
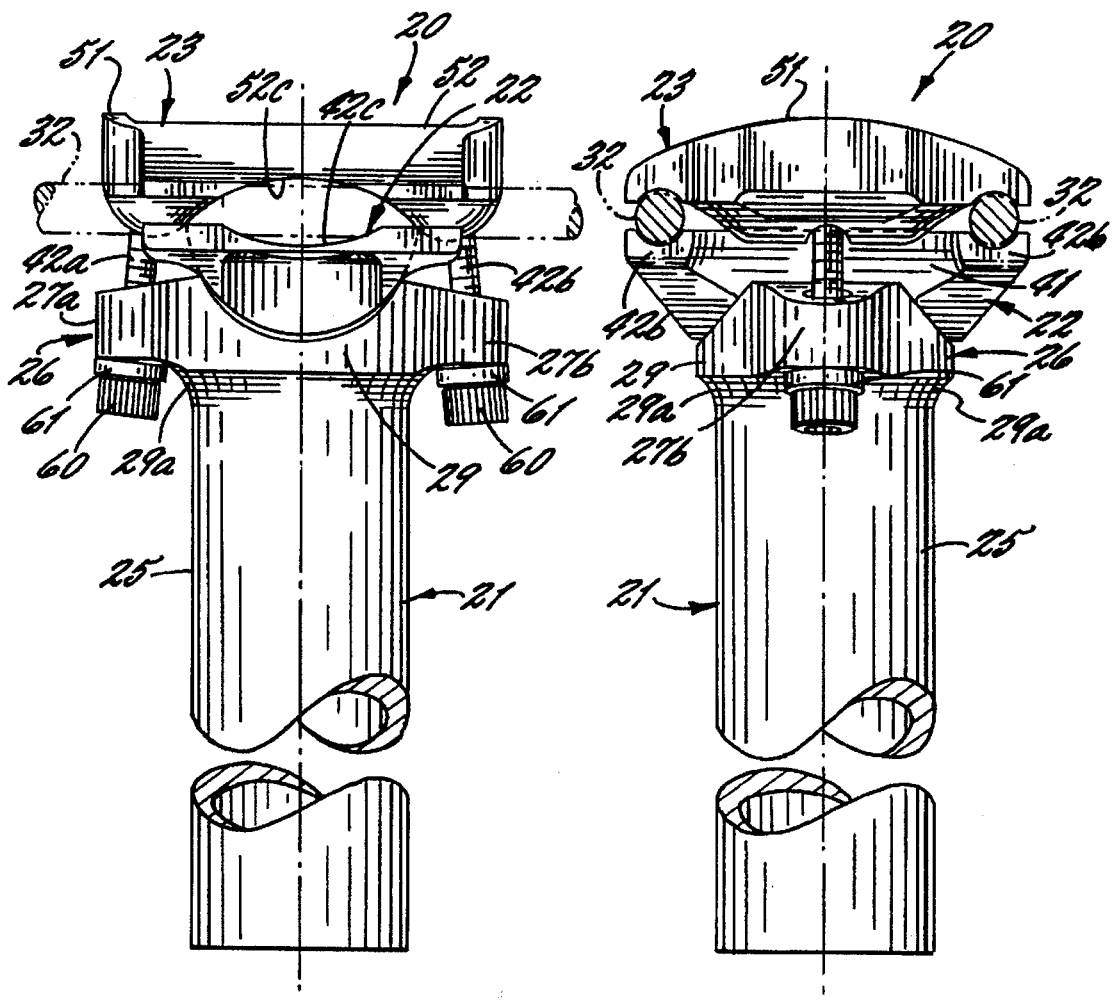
FIG. 3 is a side elevational view of the seat post and clamp in accordance with the present invention.
FIG. 4 is a front elevational view of the seat post and clamp in accordance with the present invention.
Figure 5:
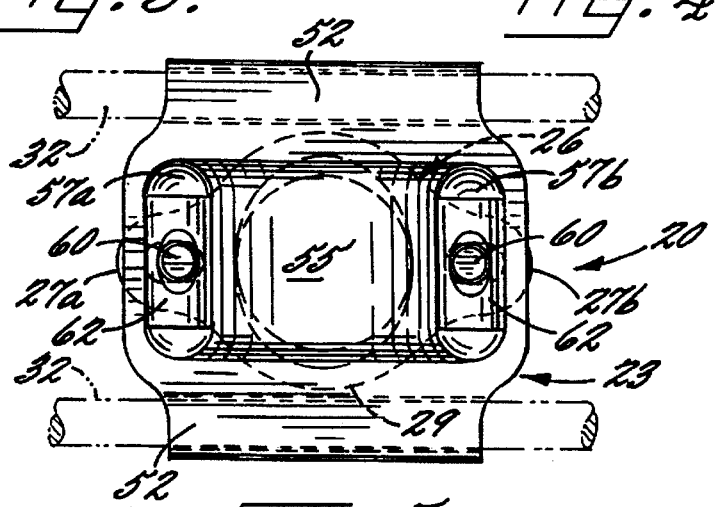
FIG. 5 is a top plan view of the seat post and clamp in accordance with the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime notation is used to indicate similar elements in alternate embodiments.

In the drawing figures, the apparatus comprising the combination of the seat post and its associated clamp is generally designated by reference numeral 20. Referring initially to FIGS. 1 through 10, the apparatus 20 is first described. More particularly, the apparatus 20 includes a seat post 21 and a clamp which, in turn, comprises lower and upper clamp members 22, 23, respectively.

The seat post 21 includes a tube 25 and a flange 26 connected to the upper end of the tube. The flange 26 is preferably integrally formed with the tube 25 to form monolithic unit therewith. The seat post 21 may be readily manufactured, such as by extrusion or impact extrusion, as would be appreciated by those skilled in the art. The illustrated flange 26 comprises a pair of opposing ears 27a, 27b extending longitudinally outwardly from the tube 25. The flange 26 also has a partial cylindrical recess 28 extending laterally along an upper surface portion thereof.

As would be readily understood by those skilled in the art, a typical bicycle seat 30 (FIG. 11) includes a saddle 31, supported by a pair of spaced apart high strength seat rails 32 extending in the longitudinal direction. The seat post 21 fits down into a tubular frame member 35 of the bicycle and is secured at a predetermined height. The height may be readily adjusted to accommodate different riders, for example.

As shown in the illustrated embodiment, the ears 27a, 27b of the flange 26 may be symmetrical relative to one another to permit positioning of the seat post 21 within the tubular frame member 35 of the bicycle frame without regard to front and back orientation. Each of the ears 27a, 27b of the flange 26 also have respective openings 37a, 37b extending therethrough for receiving respective fasteners therein.

As perhaps shown best in FIG. 6, each of the openings 37a, 37b is tapered longitudinally inwardly along the vertical direction to permit pivotal movement of the fasteners to thereby permit relative rotation of the lower clamp 22 and upper clamp 23, such as to facilitate adjustment of the seat angle. As shown in the illustrated embodiment, the flange 26 further comprises an enlarged diameter annular portion 29 connected to the end of the tube 25 and extending around the periphery thereof. The seat post 21 also preferably includes a tapered or progressively increasing diameter portion 29a extending upwardly so as to merge the upper end of the tube 25 to the annular portion 29 of the flange 26 (FIGS. 3 and 4).

Figure 10:
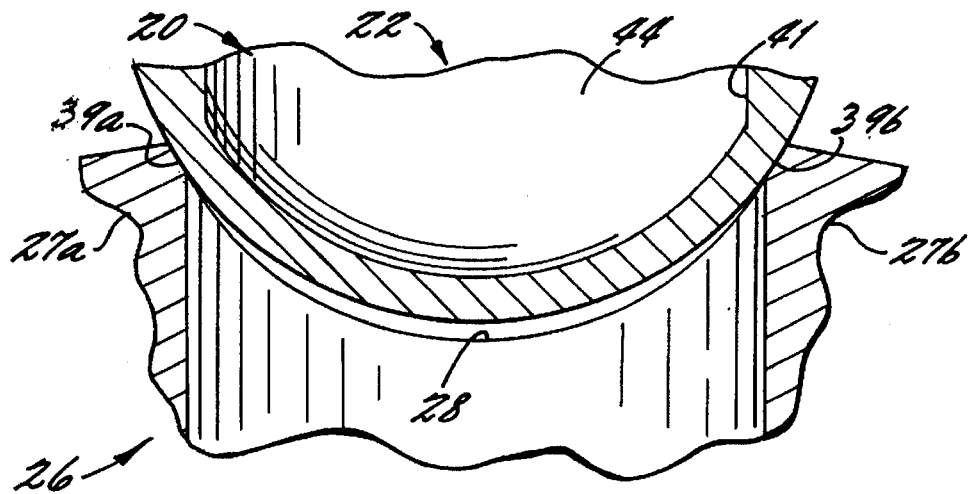
FIG. 10 is a greatly enlarged side cross-sectional view of an upper portion of the seat post and clamp in accordance with the present invention and illustrating the laterally extending contact surfaces of the seat post.

Turning now briefly to FIG. 10, the flange 26 also preferably includes an opposing pair of laterally extending contact surfaces 39a, 39b adjacent respective ears for engaging the corresponding portions of the body portion of the lower clamp member 22. The laterally extending contact surfaces 39a, 39b prevent the lower clamp member 22 from resting primarily on the bottom of the recess 28 and serve to more efficiently distribute loads.

The lower clamp member 22 includes a lower clamp body portion 41 defining a partial cylindrical shape extending laterally on a lower surface portion and being received in the recess 28 of the flange 26. The lower clamp member 22 also includes a pair of lower channel defining portions 42 connected to respective opposing longitudinally extending sides of the lower clamp body portion 41. As illustrated, each of the lower rail channel defining portions 42, in turn, comprises a pair of cantilevered rail support portions 42a, 42b extending longitudinally outwardly from the lower clamp body portion 41. In an alternate embodiment, cantilevered rail support portions may be provided only on the front or rear of the lower clamp member 22.

The lower clamp body portion 41 defines a cavity 44 opening upwardly in a medial portion thereof to thereby facilitate manufacture by stamping or forging the lower clamp member 22. Each of the lower rail channel defining portions 42 has a recess 42c in a medial portion thereof so that the lower rail channel defining portions define a pair of longitudinally spaced apart contact areas for the bicycle rails at each of the cantilevered rail support portions 42a, 42b which extend longitudinally outwardly from the lower clamp body portion 41. Thus, the cantilevered rail support portions 42a, 42b, provide a relatively wide grip on the rails 32. For example, a conventional clamp may provide only 1.1 inches of grip length, whereas the clamp of the present invention may provide about 1.6 inches. The lower channel defining portions 42 may be sloped at 0.5 degrees (plus 0 degrees or minus 0.25 degrees) so that the lower clamp member engages the rails more snugly at the end portions thereof.

The cantilevered rail support portions 42a, 42b of the lower clamp member 22 also provide a degree of flexibility to avoid bending or breaking the seat rails 32. For example, the cantilevered rail support portions 42a, 42b may elastically deform to provide about ¼ inches of movement at the ends thereof. Other portions of the clamp also elastically deform to provide a shock absorbing effect as will be readily understood by those skilled in the art.

The upper clamp member 23 overlies the lower clamp member 22 and comprises an upper clamp body portion 51 and a pair of upper channel defining portions 52 connected to opposite longitudinally extending sides of the upper clamp body portion. Each of the upper rail channel defining portions 52 has a recess 52c in a medial portion thereof so that the upper rail channel defining portions define a pair of upper longitudinally spaced apart contact areas for the bicycle rails 32 coextensive with the spaced contact areas provided primarily by the cantilevered rail support portions 42a, 42b of the lower clamp member 22. The contact surfaces of the upper clamp member may also be correspondingly sloped as described above for the lower rail channel defining portions.

The upper clamp body portion 51 preferably comprises a generally rectangular bottom wall 55 and a sidewall 56 extending upwardly around a periphery of the bottom wall. Moreover, the bottom wall 55 may be substantially concave upward so as to increase the strength of the upper clamp member 23 while permitting the upper clamp member to be relatively lightweight. Considered in somewhat different terms, the bottom wall 55 and sidewall 56 of the upper clamp member 23 also define a cavity opening upwardly to thereby facilitate manufacture by stamping or forging as would be readily understood by those skilled in the art.

The bottom wall 55 of the upper clamp body portion 51 also defines a pair of upward opening recesses 57a, 57b at opposing longitudinal ends of the body portion for receiving respective fastener portions therein, that is, for receiving the barrel nuts 62. Considered another way, opposing ends of the bottom wall 55 define a pair of bulbous laterally extending protrusions which nest in the spaces between opposite cantilevered rail support portions 42a, 42b of the lower clamp member 22 and extend below an imaginary plane defined by upper surface portions of the seat rails 32. More preferably, interior surface portions of the recesses 57a 57b extend below the imaginary plane.

The lower surface portions of the recesses 57a, 57b cooperate with the ears 27a, 27b of the flange 26 to provide a positive rotational stop when adjusting the angle of the clamp. Accordingly, the bolts 60 may be sized to be fully received within respective barrel nuts 62 even in the extreme positions of angular adjustment, thereby avoiding stripping of the bolts or nuts. Moreover, the bolts 60 may also be sized to not extend outwardly beyond the upper edges of the upper clamp member 23 in the extreme angular positions to thus provide a low profile design and reduce the possibility of puncturing the seat.

A pair of fasteners are provided for securing opposing longitudinal ends of the upper clamp body portion 51 to corresponding ears 27a, 27b of the flange 26 so as to clamp the bicycle seat rails 32 between upper and lower channel defining portions 52, 42 of the upper and lower clamp members 23, 22. As shown in the illustrated embodiment, each fastener may be provided by a threaded bolt 60 and a barrel nut 62. The bolts 60 may have a spherical head, and the spherical washers 61 may also be positioned on the bolts 60 adjacent the underside of the ears 27a, 27b of the flange 26. The spherical bolts 60 and washers 61 facilitate rotational positioning of the clamp without damaging the ears 27a, 27b.

As illustrated with particular reference to FIGS. 3 and 4, a gap is defined between the upper surface of the ears 27a, 27b and the adjacent lower portion of the upper clamp member 23. Accordingly, the seat angle may be readily adjusted by corresponding adjustment of the length of each of the fasteners, allowing infinite adjustment of seat angle as would be readily understood by those skilled in the art. Plus or minus 14 degrees of adjustment may be readily accommodated by the apparatus 20 in accordance with the present invention and limited by the positive stop feature as described above.

Referring now briefly to FIG. 9, another important feature of the present invention is explained. As illustrated, the edges of the lower and upper clamp members 42d, 52d are rounded over rather than sharply defined. Accordingly, the edges are less likely to scratch, nick or otherwise damage the bicycle seat rails 32. As would be readily understood by those skilled in the art, modern seat rails 32 may be provided by high strength composite materials which may be susceptible to breakage if the outer surface is damaged resulting in a fracture propagated through the material. Other surface edges of the clamp that contact the seat rails 32 may also be rounded over, again to reduce the likelihood of damage, particularly to composite seat rails. The grooves of the upper and lower clamp members may also be sized just slightly smaller than the width of the rails 32 to further ensure a strong grip on the rails.

The upper and lower clamp members 22, 23 are also preferably symmetrically shaped about both longitudinal and lateral planes, as illustrated, to permit assembly thereof without concern for front and back orientations.

As shown perhaps best in FIG. 8, another significant aspect of the present invention is that the seat tube 25 may have a circular outer diameter and an oval, or natural ellipse shaped, inner diameter so that laterally extending wall portions 25a are thicker than the longitudinally extending walls portions 25b. Accordingly, the tube 25 is strong, yet lightweight. For example, the laterally extending wall portions 25a may be about 0.070 to 0.120 inches thick, while the longitudinally extending wall portions 25b may be about 0.012 to 0.050 inches thick.

Figure 11:
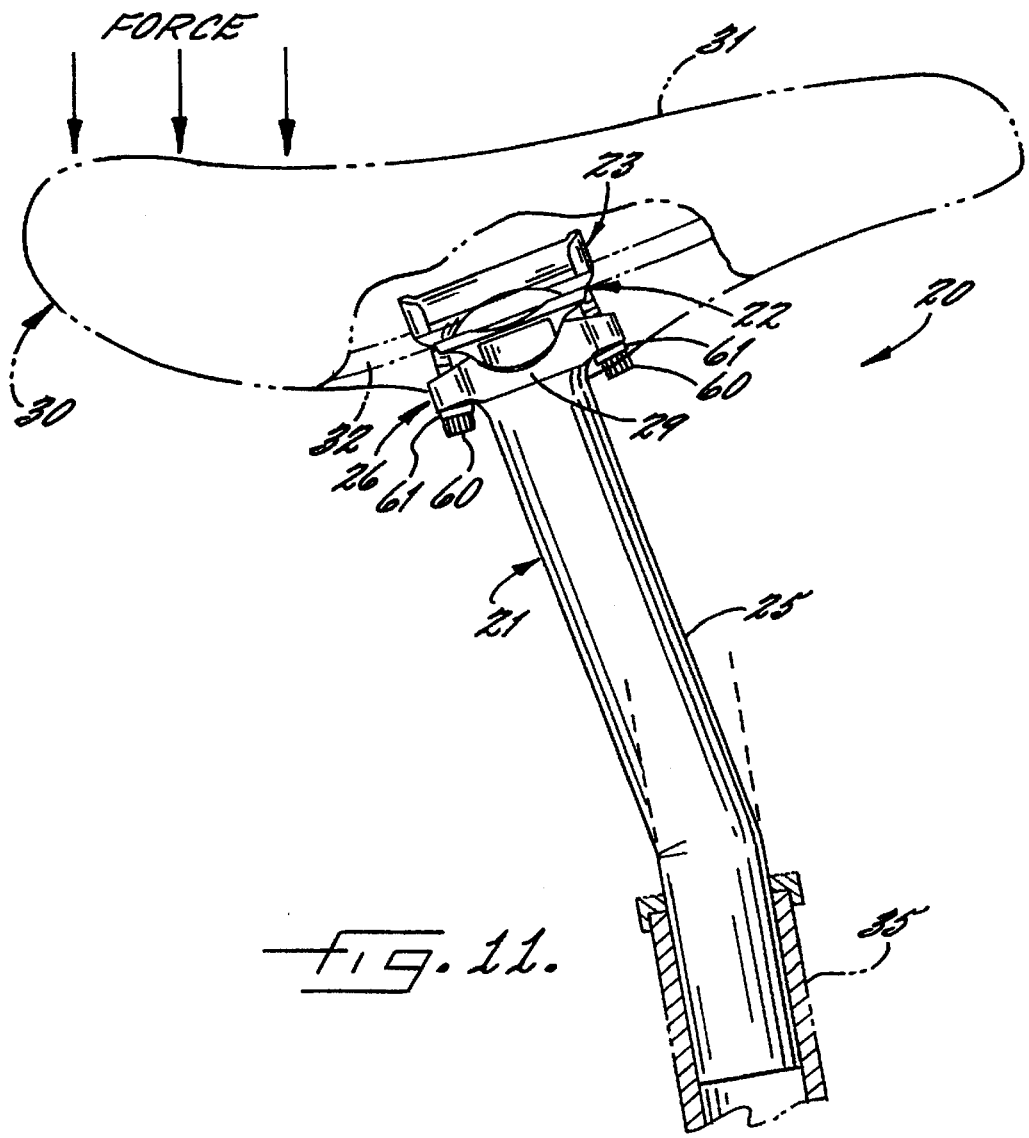
FIG. 11 is a side view, partially in section, of the seat post and clamp illustrating the bending fuse feature in accordance with the present invention.

Turning now to FIG. 11, another significant aspect of the present invention is described. Because of the relative strengths of the seat post 21, including the flange 26 and the tube 25, and the upper and lower clamp members 23, 22 when assembled to grasp the pair of seat rails 32, under heavy seat loads the tube 25 will tend to bend as illustrated. In other words, the apparatus 20 according to the invention provides a bending fuse rather than catastrophically failing as in many seat posts and clamps as in the prior art. Accordingly, rider safety is greatly enhanced.

For example, for a tube 25 having a length of about 12 inches, and where 2.5 inches is received within the frame member 35, and for a weight of about 425 pounds applied in a downward direction to the saddle 31 at about 6.5 inches from the axis of the tube 25, the tube will first deflect and then yield to the bent configuration as indicated in FIG. 11. The tube is typically inclined at an angle of about 17 degrees from vertical toward the back end of the bicycle. Thus, the most likely scenario is that the seat tube 25 bends backwards, although the tube may also bend forward. If the tube 25 is positioned into the frame 35 so that only about 5 inches of the tube is extending upwardly beyond the frame, the tube will yield or bend at a weight of about 525 pounds. The fasteners may desirably withstand a weight of greater than about 550 pounds, and the ears 27a, 27b of the flange 26 and clamp members 22, 23 may desirably withstand greater than about 700 pounds without failure.

The apparatus 20 according to the invention is sufficient for weight loads substantially greater than many popular conventional seat posts and clamps. The seat post and clamp apparatus 20 according to the present invention may also be made relatively lightweight. For example, for a seat tube having a length of about 13 inches and made of aluminum, the apparatus may weigh only about 8.1 ounces. As another example, for a seat tube having a length of about 10 inches and made of aluminum, the apparatus may weigh only about 6.0 ounces. Moreover, the seat post and clamp apparatus 20 according to the present invention incorporates a bending fuse feature for extremely high loads and, thereby, reduces the likelihood of catastrophic failure.

Turning now additionally to the embodiments of the apparatus 20 illustrated in FIGS. 12 through 18, another aspect of the invention is described. As shown in FIG. 12, a second embodiment of the seat post and clamp apparatus 70 according to the invention includes angle indication indicia which takes the form of a center mark 70a on the annular portion 29 of the flange 26 of the seat post 21, and linear markings 70b on the lower clamp member 22. FIG. 13 illustrates another embodiment of the apparatus 71 wherein the angle indication indicia takes the form of linear markings 71a on the annular portion 29 of the flange 26 of the seat post 21, and a center mark 71b on the lower clamp member 22.

Turning now to FIG. 14, yet another embodiment of the apparatus 72 is illustrated wherein the angle indication indicia takes the form of linear markings 72a on the annular portion 29 of the flange 26 of the seat post 21, and a raised or forged pointing arrow 72b on the lower clamp member 22.

FIG. 15 illustrates another embodiment of the apparatus 73 wherein the angle indication indicia takes the form of linear marking 73a on the annular portion 29 of the flange 26 of the seat post 21, and linear markings 73b on the lower clamp member 22 defining a vernier scale. FIG. 16 illustrates an embodiment of the apparatus 74 wherein the angle indication indicia takes the form of a series of spaced circular markings 74a on the annular portion 29 of the flange 26, and a marking 74b including a circular portion and linear portion depending therefrom on the lower clamp member 22. FIG. 17 illustrates another embodiment of the apparatus 75 wherein the angle indication indicia takes the form of colored or linear gradations 75a on the annular portion 29 of the flange 26 of the seat post 21, and a center mark 75b on the lower clamp member 22. As shown in FIG. 18, yet another embodiment of the seat post and clamp apparatus 76 according to the invention includes angle indication indicia which takes the form of a numbered linear markings 76a formed on the annular portion 29 of the flange 26 of the seat post 21, and a center mark 76b on the lower clamp member 22. The various indicia markings described above may be formed by etching, laser cutting, forging, printing, etc., as would be readily understood by those skilled in the art.

The seat post and clamp apparatus 20 according to the present invention is also readily secured to the seat rails 32 in a partially assembled state with all of the components being captive. The bolts 60 may then be tightened to achieve the desired seat angle and secure the seat 32 to the bicycle frame 35. The seat tube 25 may also include length markings thereon, not shown, to facilitate positioning of the tube to the proper height. Similarly, indicia, not shown, may be provided on the seat rails to facilitate positioning of the seat 32 in a front and back directions.

Turning now additionally to the embodiment of the upper clamp member 23' shown in FIGS. 19 to 19B, another aspect of the invention is described. The upper clamp member 23' may have sloping rail channel defining portions 52' as illustrated. Accordingly, a relatively large angle from perpendicular between the seat post and the seat can be accommodated. For example, a typical seat post may be inclined at about 8 to 12 degrees from vertical when positioned in the tubular member of the bicycle frame. By canting the upper rail channel defining portions 52' relative to the upper clamp body portion, this embodiment may readily accommodate angles of adjustment of up to and beyond 27 degrees, for example. In other words, a predetermined amount of slope may be designed into the upper clamp member 23', while the other components are as described above.

Many modifications and other embodiments of the invention will come to the mind of one skilled in the art. Reference is also made to co-assigned, copending patent application entitled "Lightweight High Strength Bicycle Seat Post and Associated Clamp Including Seat Angle Indicating Indicia", having attorney work docket no. 95-P-16451, the disclosure of which is incorporated herein by reference in its entirety. Therefore, it is to be understood that the invention is not to be limited to the specific embodiments disclosed, and that modifications and embodiments are intended to be included within the scope of the appended claims.

That which is claimed is:

1. An apparatus for securing a bicycle seat to a bicycle frame, the bicycle seat comprising a pair of spaced apart longitudinally extending seat rails, said apparatus comprising:

a seat post comprising a tube and a flange connected to an end of said tube, said flange comprising a pair of opposing ears extending longitudinally outwardly from said tube, said flange having an upper surface defining a laterally extending partial cylindrical recess;

a clamp connected to said seat post and comprising a lower clamp member and an upper clamp member connected together for securing the seat rails therebetween;

said lower clamp member comprising
a lower clamp body portion having a lower surface defining a laterally extending partial cylindrical shape received in the recess of said flange, and
a pair of lower rail channel defining portions connected to respective opposing longitudinally extending sides of said lower clamp body portion, each of said lower rail channel defining portions comprising at least one cantilevered rail support portion extending longitudinally outwardly from said lower clamp body portion;

said upper clamp member comprising an upper clamp body portion and a pair of upper rail channel defining portions connected to respective opposite longitudinally extending sides of said upper clamp body portion; and a pair of fasteners securing opposing longitudinal ends of said upper clamp body portion to corresponding ears of said flange so as to clamp the bicycle seat rails between upper and lower rail channel defining portions of said upper and lower clamp members.

2. An apparatus according to claim 1 wherein said tube and said flange are integrally formed as a monolithic unit.

3. An apparatus according to claim 1 wherein said tube has an axis; wherein said flange is symmetrical with respect to a first imaginary longitudinally extending plane bisecting said pair of opposing ears and lying along the axis of said tube; and wherein said flange is symmetrical with respect to a second imaginary laterally extending plane perpendicular to said first imaginary longitudinally extending plane and lying along the axis of said tube.

4. An apparatus according to claim 1 wherein said flange has spaced apart upper surface portions defining a pair of laterally extending contact surfaces adjacent respective opposite longitudinal edges of the recess for contacting corresponding adjacent portions of the lower clamp body portion.

5. An apparatus according to claim 1 wherein said flange further comprises an enlarged diameter annular portion connected to said tube.

6. An apparatus according to claim 5 wherein said flange further comprises a tapered diameter portion merging from the annular portion to the tube.

7. An apparatus according to claim 1 wherein upper surface portions of said ears slope downwardly away from said tube.

8. An apparatus according to claim 1 wherein the ears of said flange have respective fastener openings extending therethrough for receiving respective fasteners.

9. An apparatus according to claim 8 wherein the fastener openings taper longitudinally inwardly toward an upper surface of the ears.

10. An apparatus according to claim 1 wherein said tube has a circular outer diameter and an oval inner diameter so that laterally extending wall portions are thicker than longitudinally extending wall portions.

11. An apparatus according to claim 1 wherein the lower clamp body portion defines a cavity opening upwardly and outwardly in a medial portion thereof.

12. An apparatus according to claim 1 wherein each of the lower rail channel defining portions has a recess in a medial portion thereof so that the lower rail channel defining portions define a pair of longitudinally spaced apart contact areas for the respective seat rails.

13. An apparatus according to claim 1 wherein said upper clamp body portion comprises a generally rectangular bottom wall and a sidewall extending upwardly around a periphery of the bottom wall.

14. An apparatus according to claim 13 wherein the bottom wall of said upper clamp body portion is substantially concave upward.

15. An apparatus according to claim 13 wherein the bottom wall of said upper clamp body portion defines a pair of fastener receiving recesses at opposing longitudinal ends thereof for receiving respective fastener portions therein.

16. An apparatus according to claim 15 wherein an outer surface portion of at least one fastener receiving recess extends below an imaginary plane defined by upper surface portions of the seat rails so that said at least one fastener receiving recess serves as a positive rotational stop in cooperation with an adjacent ear of said flange and so that said clamp has a relatively low profile.

17. An apparatus according to claim 1 wherein each of the upper rail channel defining portions has a recess in a medial portion thereof so that the upper rail channel defining portions define a pair of longitudinally spaced contact areas for the respective seat rails.

18. An apparatus according to claim 1 wherein predetermined edge surfaces of said upper and lower clamp members exposed to the seat rails are rounded over to further protect against damage to the seat rails.

19. An apparatus according to claim 1 wherein said lower clamp member is an integrally formed monolithic unit, and wherein said upper clamp member is an integrally formed monolithic unit.

20. An apparatus according to claim 1 wherein each of said fasteners comprises a bolt, a washer, and a barrel nut secured to said bolt; and wherein said bolt has a spherical head and said washer has a spherical seating surface adjacent the spherical head of said bolt.

21. An apparatus according to claim 1 wherein said clamp is symmetrical with respect to an imaginary longitudinally extending plane intersecting an axis of said tube; and wherein said clamp is symmetrical with respect to an imaginary laterally extending plane intersecting an axis of said tube.

22. An apparatus according to claim 1 wherein said tube, said flange and said clamp have predetermined relative strengths so that the tube of said seat post bends responsive to a relatively large force offset from an axis of the tube and prior to failure of one of said flange and said clamp to thereby define a bending fuse for said apparatus.

23. An apparatus for securing a bicycle seat to a bicycle frame, the bicycle seat including a pair of spaced apart longitudinally extending seat rails, said apparatus comprising:

a seat post comprising a tube and a flange connected to an end of said tube, said flange having an upper surface defining a recess; and a clamp connected to said seat post and comprising a lower clamp member received in the recess and an upper clamp member connected to said lower clamp member for securing the seat rails therebetween;

said tube, said flange and said clamp having predetermined relative strengths so that the tube of said seat post bends responsive to a relatively large force offset from an axis of the tube and prior to failure of one of said flange and said clamp to thereby define a bending fuse for said apparatus.

24. An apparatus according to claim 23 wherein said flange comprises a pair of opposing ears extending longitudinally outwardly from said tube, and wherein said flange has an upper surface defining a laterally extending partial cylindrical recess.

25. An apparatus according to claim 24 wherein said lower clamp member comprises:

a lower clamp body portion having a lower surface defining a laterally extending partial cylindrical shape received in the recess of said flange; and a pair of lower rail channel defining portions connected to respective opposing longitudinally extending sides of said lower clamp body portion, each of said lower rail channel defining portions comprising at least one cantilevered rail support portion extending longitudinally outwardly from said lower clamp body portion.

26. An apparatus according to claim 25 wherein the lower clamp body portion defines a cavity opening upwardly and outwardly in a medial portion thereof.

27. An apparatus according to claim 25 wherein each of the lower rail channel defining portions has a recess in a medial portion thereof so that the lower rail channel defining portions define a pair of longitudinally spaced apart contact areas for the respective seat rails.

28. An apparatus according to claim 25 wherein said upper clamp member comprises an upper clamp body portion and a pair of upper rail channel defining portions connected to opposite longitudinally extending sides of said upper clamp body portion.

29. An apparatus according to claim 28 wherein said upper clamp body portion comprises a generally rectangular bottom wall and a sidewall extending upwardly around a periphery of the bottom wall.

30. An apparatus according to claim 29 wherein the bottom wall of said upper clamp body portion defines a pair of fastener receiving recesses at opposing longitudinal ends thereof for receiving respective fastener portions therein.

31. An apparatus according to claim 30 wherein an outer surface portion of at least one fastener receiving recess extends below an imaginary plane defined by upper surface portions of the seat rails so that said at least one fastener receiving recess serves as a positive rotational stop in cooperation with an adjacent ear of said flange and so that said clamp has a relatively low profile.

32. An apparatus according to claim 28 wherein each of the upper rail channel defining portions has a recess in a medial portion thereof so that the upper rail channel defining portions define a pair of longitudinally spaced contact areas for the respective seat rails.

33. An apparatus according to claim 28 further comprising a pair of fasteners securing opposing longitudinal ends of said upper clamp body portion to corresponding ears of said flange so as to clamp the bicycle seat rails between upper and lower rail channel defining portions of said upper and lower clamp members.

34. An apparatus according to claim 23 wherein said tube and said flange are integrally formed as a monolithic unit.

35. An apparatus according to claim 23 wherein said seat post has an axis; wherein said clamp is symmetrical with respect to a first imaginary longitudinally extending plane extending perpendicular to said laterally extending recess and lying along the axis of said seat post; and wherein said clamp is symmetrical with respect to a second imaginary laterally extending plane perpendicular to said first imaginary longitudinally extending plane and lying along the axis of said seat post.

36. An apparatus according to claim 23 wherein said flange has spaced apart upper surface portions defining a pair of laterally extending contact surfaces adjacent respective opposite longitudinal edges of the recess for contacting corresponding adjacent portions of the lower clamp body portion.

37. An apparatus according to claim 23 wherein said tube has a circular outer diameter and an oval inner diameter so that laterally extending wall portions are thicker than longitudinally extending wall portions.

38. An apparatus according to claim 29 wherein predetermined edge surfaces of said upper and lower clamp members exposed to the seat rails are rounded over to further protect against damage to the seat rails.

39. An apparatus according to claim 23 wherein said lower clamp member is an integrally formed monolithic unit, and wherein said upper clamp member is an integrally formed monolithic unit.

40. An apparatus according to claim 23 wherein said tube has an axis; wherein said flange is symmetrical with respect to a first imaginary longitudinally extending plane bisecting said pair of opposing ears and lying along the axis of said tube; and wherein said flange is symmetrical with respect to a second imaginary laterally extending plane perpendicular to said first imaginary longitudinally extending plane and lying along the axis of said tube.

41. An apparatus for securing a bicycle seat to a bicycle frame, the bicycle seat including a pair of spaced apart longitudinally extending seat rails, said apparatus comprising:

a seat post comprising a tube and a flange connected to an end of said tube and being integrally formed together as a monolithic unit, said flange having an upper surface defining a laterally extending recess;

a clamp connected to said seat post and comprising a monolithic lower clamp member and a monolithic upper clamp member connected together for securing the seat rails therebetween;

said monolithic lower clamp member comprising a lower clamp body portion having a lower surface defining a laterally extending shape received in the recess of said flange, and a pair of lower rail channel defining portions connected to respective opposing longitudinally extending sides of said lower clamp body portion, each of said lower rail channel defining portions comprising at least one cantilevered rail support portion extending longitudinally outwardly from said lower clamp body portion;

said monolithic upper clamp member comprising an upper clamp body portion and a pair of upper rail channel defining portions connected to opposite longitudinally extending sides of said upper clamp body portion; and a pair of fasteners securing opposing longitudinal ends of said monolithic upper clamp body portion to corresponding ears of said flange so as to clamp the bicycle seat rails between the upper and lower rail channel defining portions of said upper and lower monolithic clamp members.

42. An apparatus according to claim 41 wherein each of said lower rail channel defining portions comprises at least one cantilevered rail support portion extending longitudinally outwardly from said lower clamp body portion.

43. An apparatus according to claim 41 wherein said tube has an axis; wherein said flange is symmetrical with respect to a first imaginary longitudinally extending plane bisecting said pair of opposing ears and lying along the axis of said tube; and wherein said flange is symmetrical with respect to a second imaginary laterally extending plane perpendicular to said first imaginary longitudinally extending plane and lying along the axis of said tube.

44. An apparatus according to claim 41 wherein said tube has a circular outer diameter and an oval inner diameter so that laterally extending wall portions are thicker than longitudinally extending wall portions.

45. An apparatus according to claim 41 wherein the lower clamp body portion defines a cavity opening upwardly and outwardly in a medial portion thereof.

46. An apparatus according to claim 41 wherein each of the lower rail channel defining portions has a recess in a medial portion thereof so that the lower rail channel defining portions define a pair of longitudinally spaced apart contact areas for the respective seat rails.

47. An apparatus according to claim 41 wherein said upper clamp body portion comprises a generally rectangular bottom wall and a sidewall extending upwardly around a periphery of the bottom wall.

48. An apparatus according to claim 47 wherein the bottom wall of said upper clamp body portion is concave upward.

49. An apparatus according to claim 47 wherein the bottom wall of said upper clamp body portion defines a pair of fastener receiving recesses at opposing longitudinal ends thereof for receiving respective fastener portions therein.

50. An apparatus according to claim 43 wherein an outer surface portion of at least one fastener receiving recess extends below an imaginary plane defined by upper surface portions of the seat rails so that said at least one fastener receiving recess serves as a positive rotational stop in cooperation with an adjacent ear of said flange and so that said clamp has a relatively low profile.

51. An apparatus according to claim 41 wherein each of the upper rail channel defining portions has a recess in a medial portion thereof so that the upper rail channel defining portions define a pair of longitudinally spaced contact areas for the respective seat rails.

52. An apparatus according to claim 41 wherein predetermined edge surfaces of said upper and lower clamp members exposed to the seat rails are rounded over to further protect against damage to the seat rails.

53. An apparatus according to claim 41 wherein said seat post has an axis; wherein said clamp is symmetrical with respect to a first imaginary longitudinally extending plane extending perpendicular to said laterally extending recess and lying along the axis of said seat post; and wherein said clamp is symmetrical with respect to a second imaginary laterally extending plane perpendicular to said first imaginary longitudinally extending plane and lying along the axis of said seat post.

54. An apparatus for securing a bicycle seat to a bicycle frame, the bicycle seat comprising a pair of spaced apart longitudinally extending seat rails, said apparatus comprising:

a seat post comprising a tube and a flange connected to an end of said tube, said flange comprising a pair of opposing ears extending longitudinally outwardly from said tube, said flange having an upper surface defining a laterally extending partial cylindrical recess;

a clamp connected to said seat post and comprising a lower clamp member and an upper clamp member connected together for securing the seat rails therebetween;

said lower clamp member comprising a lower clamp body portion having a lower surface defining a laterally extending partial cylindrical shape received in the recess of said flange and a pair of lower rail channel defining portions connected to respective opposing longitudinally extending sides of said lower clamp body portion;

said upper clamp member comprising an upper clamp body portion, a pair of upper rail channel defining portions connected to respective opposite longitudinally extending sides of said upper clamp body portion, said upper clamp body portion including a pair of fastener receiving recesses at opposing longitudinal ends thereof; and a pair of fasteners securing opposing longitudinal ends of said upper clamp body portion to corresponding ears of said flange so as to clamp the bicycle seat rails between upper and lower rail channel defining portions of said upper and lower clamp members, each fastener comprising a threaded shaft and a mating nut connected thereto;

an outer surface portion of at least one fastener receiving recess extending below an imaginary plane defined by upper surface portions of the seat rails and the threaded shafts of each of said fasteners having a predetermined length and being positioned so that said at least one fastener receiving recess serves as a positive rotational stop in cooperation with an adjacent ear of said flange while both threaded shafts are connected to respective nuts and so that said clamp has a relatively low profile.

55. An apparatus according to claim 54 wherein said tube and said flange are integrally formed as a monolithic unit.

56. An apparatus according to claim 54 wherein said tube has an axis; wherein said flange is symmetrical with respect to a first imaginary longitudinally extending plane bisecting said pair of opposing ears and lying along the axis of said tube; and wherein said flange is symmetrical with respect to a second imaginary laterally extending plane perpendicular to said first imaginary longitudinally extending plane and lying along the axis of said tube.

57. An apparatus according to claim 54 wherein upper surface portions of said ears slope downwardly away from said tube.

58. An apparatus according to claim 54 wherein the ears of said flange have respective fastener openings extending therethrough for receiving respective fasteners.

59. An apparatus according to claim 54 wherein the lower clamp body portion defines a cavity opening upwardly and outwardly in a medial portion thereof.

60. An apparatus according to claim 54 wherein said upper clamp body portion comprises a generally rectangular bottom wall and a sidewall extending upwardly around a periphery of the bottom wall.

61. An apparatus according to claim 54 wherein predetermined edge surfaces of said upper and lower clamp members exposed to the seat rails are rounded over to further protect against damage to the seat rails.

62. An apparatus according to claim 54 wherein said lower clamp member is an integrally formed monolithic unit, and wherein said upper clamp member is an integrally formed monolithic unit.

63. A bicycle seat post for use with an associated clamp to secure a bicycle seat to a bicycle frame, said seat post comprising:

a tube; and a flange connected to an end of said tube, said flange comprising a pair of opposing ears extending longitudinally outwardly from said tube, said flange having an upper surface defining a laterally extending partial cylindrical recess for receiving therein a lower portion of a clamp;

said tube having a circular outer diameter and an oval inner diameter so that laterally extending wall portions are thicker than longitudinally extending wall portions.

64. A bicycle seat post according to claim 63 wherein said tube and said flange are integrally formed as a monolithic unit.

65. A bicycle seat post according to claim 63 wherein said flange is symmetrical with respect to an imaginary longitudinally extending plane intersecting an axis of said tube; and wherein said flange is symmetrical with respect to an imaginary laterally extending plane intersecting an axis of said tube.

66. A bicycle seat post according to claim 63 wherein said flange has spaced apart upper surface portions defining a pair of laterally extending contact surfaces adjacent respective opposite longitudinal edges of the recess for contacting corresponding adjacent portions of the lower clamp body portion.

67. A bicycle seat post according to claim 63 wherein said flange further comprises an enlarged diameter annular portion connected to said tube.

68. A bicycle seat post according to claim 63 wherein said flange further comprises a tapered diameter portion merging from the annular portion to the tube.

69. A bicycle seat post according to claim 63 wherein upper surface portions of said ears slope downwardly away from said tube.

70. A bicycle seat post according to claim 63 wherein the ears of said flange have respective fastener openings extending therethrough for receiving respective fasteners.

71. A bicycle seat post according to claim 70 wherein the fastener openings taper longitudinally inwardly toward an upper surface of the ears.

72. A bicycle seat clamp for securing a bicycle seat to a bicycle seat post, said bicycle seat clamp comprising:

a lower clamp member comprising a lower clamp body portion having a lower surface defining a laterally extending partial cylindrical shape for being received in a corresponding recess of a seat post, and a pair of lower rail channel defining portions connected to respective opposing longitudinally extending sides of said lower clamp body portion, each of said lower rail channel defining portions comprising at least one cantilevered rail support portion extending longitudinally outwardly from said lower clamp body portion; and an upper clamp member overlying said lower clamp member and comprising an upper clamp body portion and a pair of upper rail channel defining portions connected to opposite longitudinally extending sides of said upper clamp body portion and cooperating with the lower channel defining portions to secure the bicycle seat rails therebetween, said upper clamp body portion comprising a generally rectangular bottom wall and a sidewall extending upwardly around a periphery of the bottom wall.

73. A bicycle seat clamp according to claim 72 wherein predetermined edge surfaces of said upper and lower clamp members exposed to the seat rails are rounded over to further protect against damage to the seat rails.

74. A bicycle seat clamp according to claim 72 wherein the lower clamp body portion defines a cavity opening upwardly and outwardly in a medial portion thereof.

75. A bicycle seat clamp according to claim 72 wherein each of the lower rail channel defining portions has a recess in a medial portion thereof so that the lower rail channel defining portions define a pair of longitudinally spaced apart contact areas for the respective seat rails.

76. A bicycle seat clamp according to claim 72 wherein the bottom wall of said upper clamp body portion is substantially concave upward.

77. A bicycle seat clamp according to claim 72 wherein the bottom wall of said upper clamp body portion defines a pair of fastener receiving recesses at opposing longitudinal ends thereof for receiving respective fastener portions therein.

78. A bicycle seat clamp according to claim 72 wherein an outer surface portion of at least one fastener receiving recess extends below an imaginary plane defined by upper surface portions of the seat rails.

79. A bicycle seat clamp according to claim 72 wherein an outer surface portion of each of said fastener receiving recesses extends below an imaginary plane defined by upper surface portions of the seat rails.

80. A bicycle seat clamp according to claim 72 wherein each of the upper rail channel defining portions has a recess in a medial portion thereof so that the upper rail channel defining portions define a pair of longitudinally spaced contact areas for the respective seat rails.

81. A bicycle seat clamp according to claim 72 wherein said lower clamp member is an integrally formed monolithic unit, and wherein said upper clamp member is an integrally formed monolithic unit.

82. A bicycle seat clamp according to claim 72 further comprising indicia means on said clamp for facilitating indicating an angle setting of said clamp relative to a seat post.

83. An apparatus according to claim 72 wherein said upper and lower clamp members have respective axes along a first direction parallel to respective upper and lower rail channel defining portions; wherein said upper and lower clamp members are symmetrical with respect to respective first imaginary longitudinally extending planes lying along the respective axes; and wherein said upper and lower clamp members are symmetrical with respect to second imaginary laterally extending planes perpendicular to the first imaginary longitudinally extending planes.

84. A bicycle seat clamp for securing a bicycle seat toga bicycle seat post, said bicycle seat clamp comprising:

a lower clamp member comprising a lower clamp body portion having a lower surface defining a laterally extending shape for being received in a corresponding recess of a seat post, and a pair of lower rail channel defining portions connected to respective opposing longitudinally extending sides of said lower clamp body portion; and an upper clamp member overlying said lower clamp member and comprising an upper clamp body portion and a pair of upper rail channel defining portions connected to opposite longitudinally extending sides of said upper clamp body portion and cooperating with the lower rail channel defining portions to secure the seat rails therebetween;

said upper and lower clamp members having predetermined edge portions exposed to the seat rails being rounded over to further protect against damage to the seat rails.

85. A bicycle seat clamp according to claim 84 wherein said lower clamp member is an integrally formed monolithic unit, and wherein said upper clamp member is an integrally formed monolithic unit.

86. An apparatus according to claim 84 wherein said upper and lower clamp members have respective axes along a first direction parallel to respective upper and lower rail channel defining portions; wherein said upper and lower clamp members are symmetrical with respect to respective first imaginary longitudinally extending planes lying along the respective axes; and wherein said upper and lower clamp members are symmetrical with respect to second imaginary laterally extending planes perpendicular to the first imaginary longitudinally extending planes.

* * * * *